Feb. 14, 1928.
C. L. BOTHWELL ET AL
1,658,916
FIBER REMOVING MACHINE
Filed March 11, 1927   3 Sheets-Sheet 2
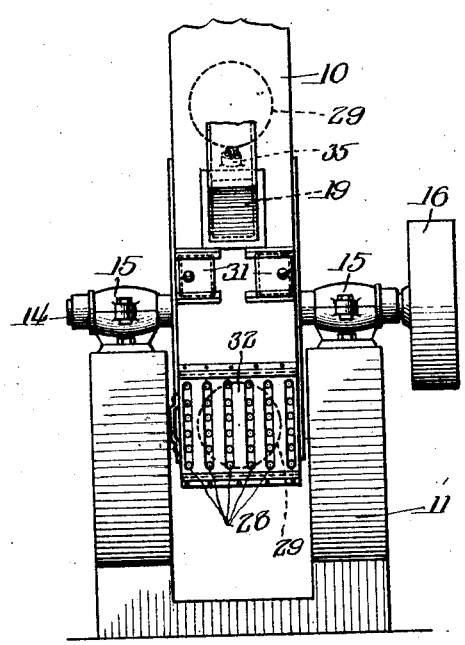
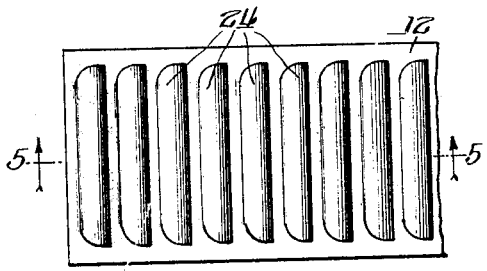
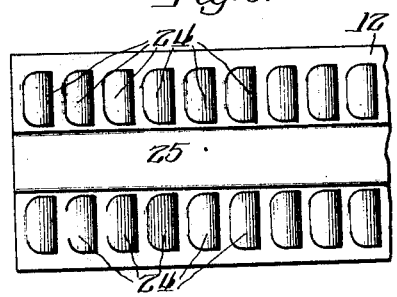
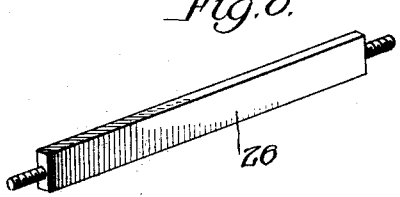
Inventors:
Cecil L. Bothwell,
Kirtland C. Barton,
Roscoe Barton,

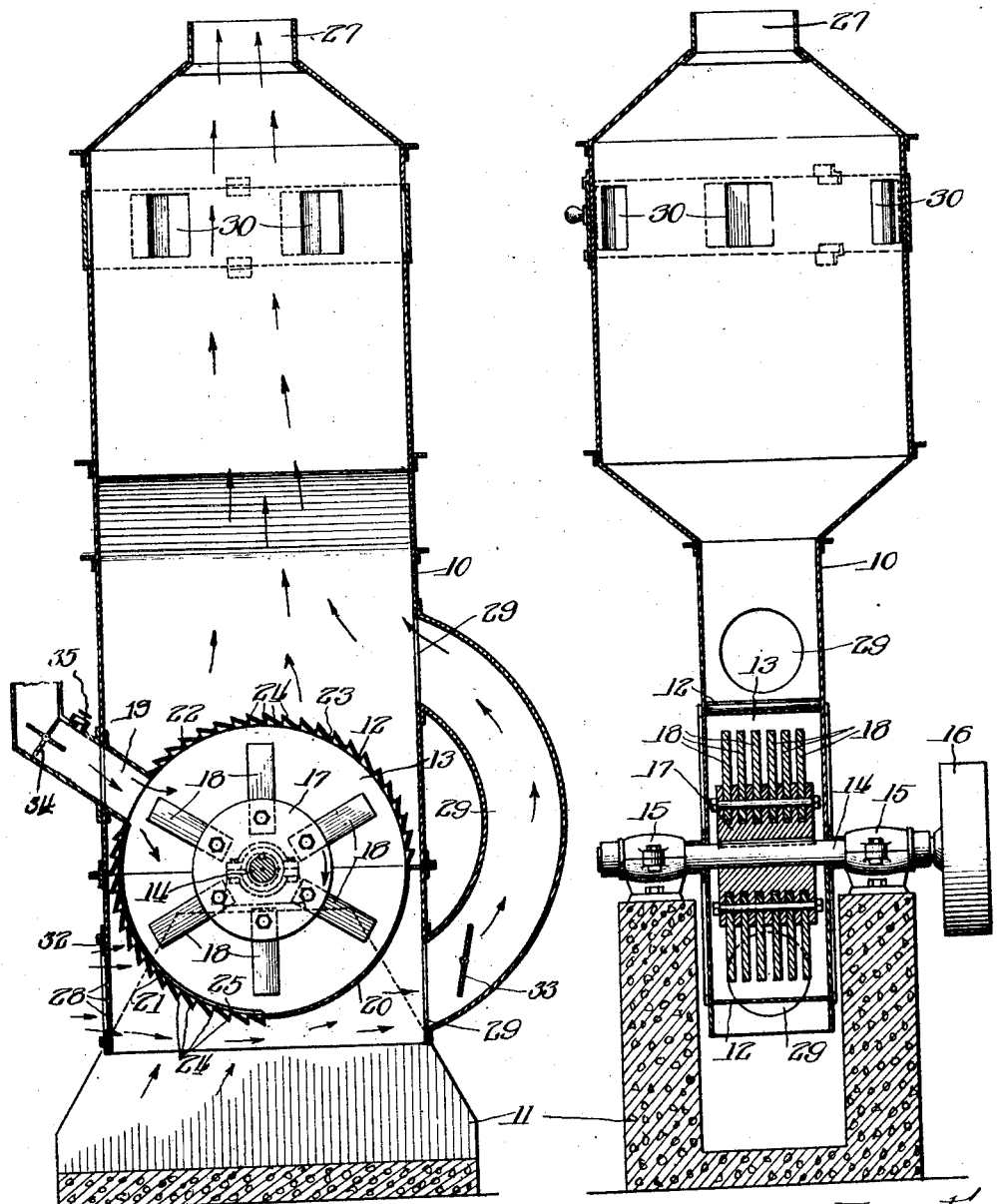

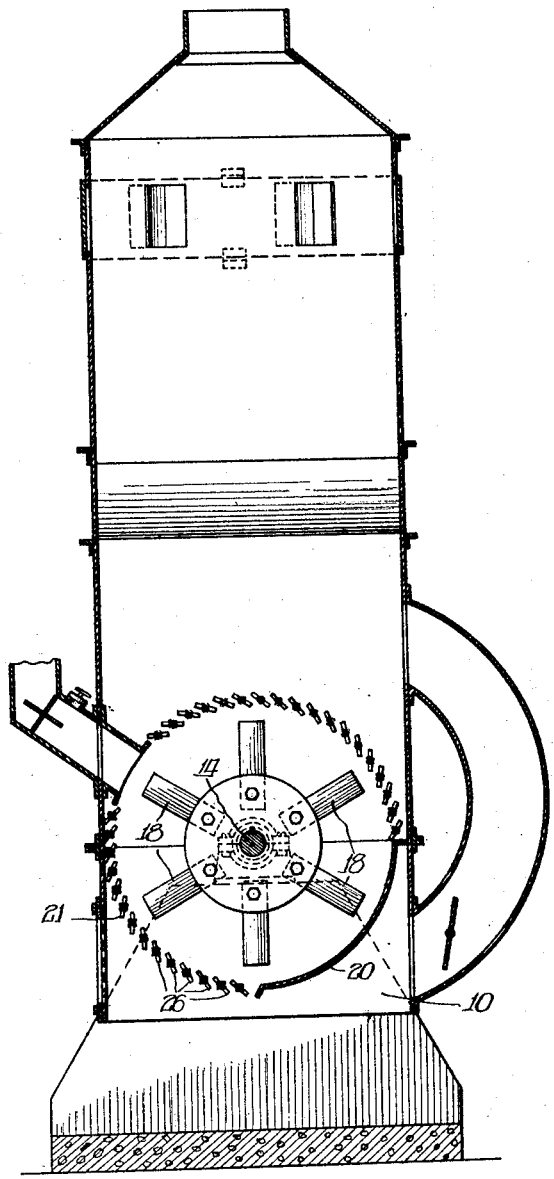

Patented Feb. 14, 1928.

1,658,916

UNITED STATES PATENT OFFICE.

CECIL L. BOTHWELL, KIRTLAND C. BARTON, AND ROSCOE BARTON, OF NATIONAL STOCK YARDS, ILLINOIS, ASSIGNORS TO ARMOUR & COMPANY, OF CHICAGO, ILLINOIS, A CORPORATION OF ILLINOIS.

FIBER-REMOVING MACHINE.

Application filed March 11, 1927. Serial No. 174,499.

In the production of cotton, the raw or unseated cotton, after being picked in the field, is taken to a gin, where the seeds are removed and the cotton is baled. The seeds as they come from the gin are covered with a fine fiber or lint, which is composed of seed hairs and some of the shorter cotton, and this fibrous covering, which has a commercial value in the manufacture of fiber, is then partially removed from the seeds by passing them through a machine known as a linter. After passing through the linter, the seeds, which still retain an appreciable amount of the fiber thereon, are passed through a machine known as a huller, where the seeds are cut open and the resulting kernels and hulls are separated. The kernels are then treated to extract the oil therefrom, after which they are ground and disposed of as stock food, and the hulls, which still retain the fiber thereon, are also disposed of as stock food.

The object of the present invention is to provide a novel machine and process by means of which all of the fiber may be removed from the cotton seed hulls and salvaged. The machine and process are applicable not only to the handling of cotton seed hulls but to the handling of the whole seeds as well, in which latter connection the intermediate use of a linter may be dispensed with.

While the foregoing statement is indicative of the nature of the invention, other objects and advantages will be evident to those skilled in the art upon an understanding of the construction of the machine and the nature of the process.

In order that the invention may be readily understood, one preferred structural embodiment of the machine is illustrated in the accompanying drawings and hereinafter described, but it will be evident that the machine is susceptible of modification in various structural details coming equally within the comprehensive scope of the claims which define the invention.

In the drawings—

Fig. 1 is a vertical section through the machine;

Fig. 2 is another vertical section, taken at right angles to Fig. 1;

Fig. 3 is a fragmentary front elevation;

Fig. 4 is a detail of a portion of the peripheral wall of the cylindrical casing in the machine;

Fig. 5 is a section taken on the line 5—5 of Fig. 4;

Fig. 6 is a detail of another portion of the peripheral wall of the casing;

Fig. 7 is a vertical section corresponding to Fig. 1, but showing a modified construction of the louvers; and Fig. 8 is a perspective view of one of the louvers shown in Fig. 7.

It will be observed in the drawings that the machine which is therein illustrated as one possible embodiment of the invention is contained within an upright stack 10 which is mounted on a suitable base 11. The lower portion of the stack 10 is preferably rectangular in cross section, and is provided with a circular partition wall 12 which extends between the side walls of the stack and constitutes therewith a cylindrical casing 13.

A shaft 14 extends horizontally through the center of the casing 13, and is journalled exteriorly of the same in suitable bearing brackets 15 which are mounted on the base 11. A pulley 16 is secured to one end of the shaft 14 for rapidly rotating the same in a clock-wise direction (as viewed in Fig. 1) from a power source, not shown, and a hub 17 carrying a large number of radially extending beater arms 18 secured to the medial of the shaft 14 for rotation with the same in a vertical plane. The beater arms do not extend to the peripheral wall 12 of the casing, but terminate preferably a substantial distance therefrom. The cotton seed hulls or other material to be defibrated is fed into the casing 13 through a downwardly inclined chute 19 which passes through an aperture in the front of the stack 10 and registers with an aperture in the wall 12 at a point above the level of the shaft 14.

The invention, in so far as the construction of the machine is concerned, resides primarily in the hereinafter described characteristics of the peripheral wall 12 of the casing 13, as it is to such characteristics that the splendid separative action of the machine is in large measure attributable.

The wall 12 of the casing 13 may be divided for the purpose of consideration into four sections, 20, 21, 22 and 23. The section 20 is imperforate, while the sections 21, 22 and 23 are punched out, as shown in Figs. 1, 4 and 5, to form therein a large number of transversely extending louvers 24, each of which is arranged at a substantial inclination to both the radius and the tangent of the casing. The louvers in the section 21 preferably do not extend the full width of the casing 13, but are medially interrupted, as shown in Fig. 6, to constitute along the middle of the section a raised imperforate strip 25.

In Figs. 7 and 8 is shown an alternative form of louver, 26, which is separately constructed and positioned and is preferable to the punched out form in those installations where it is desirable to be able to effect an adjustment of the inclination of the louvers for handling the same or other kinds of materials.

The stack 10 of the machine preferably increases in cross sectional area above the casing 13, and has a constricted top opening 27 which communicates with a device, not shown, for creating a strong upward current of air in the stack. The air forming the current enters the stack through the bottom and through a number of air inlets 28 in the front near the bottom, and the greater part of the current is drawn upwardly through the casing 13, entering the casing through the louvers in the bottom and leaving the same through the louvers in the top, while a small part of the current is at the same time drawn laterally beneath the casing 13 and into a conduit 29 which leaves the stack at a point below the casing and reenters the same at a point above the casing.

The air current passing up through the stack may be controlled by making any or all of several adjustments. The intensity of the vacuum at the top of the stack may be varied. The intake of air near the top may be varied by adjustably closed apertures 30, and the intake of air near the bottom may be varied by means of adjustably closed apertures 31 or a register 32 over the air inlets 28. The proportion of air passing up through the openings in the bottom of the casing may be controlled by adjustment of an air valve 33 in the bypass conduit 29, or by the use of a vacuum feeder 34 in the chute 19 in conjunction with an adjustable air valve 35 in the same.

The operation of the machine is as follows:

The beater arms are rotated in the casing at a high rate of speed, for instance 900 R. P. M., the air controlling devices are adjusted to effect a rising current of air in the stack through the louvers in the casing, and the cotton seed hulls or other material to be defibrated are fed into the casing through the chute in the peripheral wall of the same. The arms cause the material to whirl rapidly, but at a less rate of speed than the arms, and the whirling mass receives both a beating action from the arms and a rubbing action from the casing, as a result of which the fiber is effectively loosened from the hulls. The defibrated hulls, being heavier than the other contents of the casing, are affected by centrifugal force and move toward the peripheral wall of the casing, and, as they are swept around over the louvers in the bottom of the casing, they drop back through those louvers under gravity and accumulate in the open portion of the base below the stack. The fiber which is removed from the hulls is picked up in the casing by the rising air current therein and is carried upwardly through the louvers in the top of the casing, after which the fiber continues upwardly and passes through the top opening in the stack, where it is collected and baled. The air current in the stack is of sufficient intensity to carry the fiber out of the casing through the louvers in the top of the same, but will not carry the defibrated hulls upwardly through those louvers. The action of the rapidly moving arms causes air to be sucked through the openings in the bottom of the casing and discharged through the openings in the top with the assistance of the suction through the top of the stack. The fiber is prevented from falling through the louvers in the bottom of the casing with the defibrated hulls by the current of air which is entering the casing through those louvers, but a small amount of the fiber may nevertheless pass through those louvers with the hulls, and such fiber is picked up by the cross current of air beneath the casing which will carry the fiber upwardly about the casing and into the fiber laden current coming from the top of the same.

The invention, in so far as the process is concerned, resides in beating the fiber from the hulls while whirling the mass in a vertical plane, permitting the hulls to drop by gravity from the bottom of the mass, bringing the air current in through the bottom, and causing the fiber to rise with the air current through the top of the mass.

We claim:

1. In a defibrating machine, a casing having a curved bottom which is provided with outlets for the defibrated material and a curved top which is provided with outlets for the fiber removed from the material, means for whirling the material to be defibrated around in the casing in a vertical plane in proximity to the outlets, and means for creating both a rising current of air through the outlets in the top of the casing and a lateral current of air below the outlets in the bottom of the casing.

2. In a defibrating machine, a casing which is substantially circular in a vertical plane and is provided in the curved wall thereof with a plurality of outlets which extend outwardly through the wall at an inclination thereto, means for whirling the material to be defibrated around in the casing in a vertical plane in a direction opposite to that in which the outlets are inclined, and means for creating a rising current of air through those outlets in the top of the casing.

3. In a defibrating machine, a cylindrical casing which is arranged with its axis in a horizontal position and is provided in the curved wall thereof with a plurality of outlets which extend outwardly through the wall at an inclination thereto, a shaft which is positioned axially within the casing and is provided with a plurality of beater arms which rotate with the shaft in a vertical plane in a direction opposite to that in which the outlets are inclined, and means for creating a rising current of air through the outlets in the top of the casing.

4. In a defibrating machine, a cylindrical casing which is arranged with its axis in a horizontal position and is provided in the curved wall thereof with a plurality of outlets which extend outwardly through the wall at an inclination thereto, a shaft which is positioned axially within the casing and is provided with a plurality of beater arms which rotate with the shaft in a vertical plane in a direction opposite to that in which the outlets are inclined and terminate outwardly in spaced relation to the outlets in the casing, and means for creating a rising current of air through the outlets in the top of the casing.

5. In a defibrating machine, a vertically extending stack, a casing in the stack which is substantially circular in a vertical plane and is provided in the curved wall thereof with a plurality of outlets which extend outwardly through the wall at an inclination thereto, a chute extending through the stack into the casing for introducing thereinto the material to be defibrated, means for whirling the material around in the casing in proximity to the outlets in the same, means for creating a rising current of air in the stack through the casing, an outlet in the stack above the casing for the fiber removed from the material, and an outlet in the stack below the casing for the defibrated material.

6. In a defibrating machine, a vertically extending stack, a casing in the lower portion of the stack which is substantially circular in a vertical plane and is provided in the curved wall thereof with a plurality of outlets which extend outwardly through the wall at an inclination thereto, a chute extending through the stack into the casing for introducing thereinto the material to be defibrated, means for whirling the material around in the casing in proximity to the outlets in the same, means for creating a rising current of air in the stack through the casing, an outlet in the stack above the casing for the fiber removed from the material, an outlet in the stack below the casing for the defibrated material, and means for creating a cross current of air beneath the casing between the same and the outlet for the defibrated material.

7. In a defibrating machine, a substantially cylindrical casing which is arranged with its axis in a horizontal plane and is provided in the curved wall thereof with a plurality of inclined louvers which constitute in one portion of the wall outlets for the defibrated material and in another portion of the wall outlets for the fiber removed from the material, and means for whirling the material to be defibrated around in the casing in a vertical plane in a direction opposite to that in which the louvers are inclined.

8. In a defibrating machine, a substantially cylindrical casing which is arranged with its axis in a horizontal plane and is provided in the curved wall thereof with a plurality of adjustably inclined louvers which constitute in one portion of the wall outlets for the defibrated material and in another portion of the wall outlets for the fiber removed from the material, and means for whirling the material to be defibrated around in the casing in a vertical plane in a direction opposite to that in which the louvers are inclined.

9. In a defibrating machine, a casing having outlets in the lower portion for the defibrated material and other outlets in the upper portion for the fiber removed from the material, means for whirling the material to be defibrated in the casing in a vertical plane, and means for creating both a current of air through both sets of outlets and a lateral current of air across the first mentioned set of outlets.

10. In a defibrating machine, a casing which is provided with a plurality of outlets for the defibrated material which extend outwardly through the wall of the casing at an inclination thereto and a plurality of other outlets for the fiber removed from the material, means for whirling the material to be defibrated around in the casing in a direction opposite to that in which the first mentioned outlets are inclined, and means for creating a current of air through the second mentioned outlets.

11. In a defibrating machine, a casing which is provided with a plurality of outlets for the defibrated material and a plurality of other outlets for the fiber removed from the material which extend outwardly through the wall of the casing at an inclination thereto, means for whirling the material to be defibrated around in the casing in a direction opposite to that in which the second mentioned outlets are inclined, and means for creating a current of air inwardly through the first mentioned outlets.

12. In a defibrating machine, a casing which is provided in one portion with a plurality of outlets for the fiber removed from the material being defibrated and in another portion with a plurality of inclined louvers which constitute outlets for the defibrated material, and means for whirling the material to be defibrated around in the casing in a direction opposite to that in which the louvers are inclined.

13. In a defibrating machine, a casing which is provided in one portion with a plurality of outlets for the defibrated material and in another portion with a plurality of inclined louvers which constitute outlets for the fiber removed from the material, and means for whirling the material to be defibrated around in the casing in a direction opposite to that in which the louvers are inclined.

14. In a defibrating machine, a casing which is provided in its lower portion with a plurality of outlets for the defibrated material which extend outwardly through the wall of the casing at an inclination thereto and in its upper portion with a plurality of other outlets for the fiber removed from the material, means for whirling the material to be defibrated around in the casing in a vertical plane in a direction opposite to that in which the first mentioned outlets are inclined, and means for creating a current of air through the second mentioned outlets.

15. In a defibrating machine, a casing which is provided in its lower portion with a plurality of outlets for the defibrated material and in its upper portion with a plurality of other outlets for the fiber removed from the material which extend outwardly through the wall of the casing at an inclination thereto, means for whirling the material to be defibrated around in the casing in a vertical plane in a direction opposite to that in which the second mentioned outlets are inclined, and means for creating a current of air inwardly through the first mentioned outlets.

16. In a defibrating machine, a casing which is provided in one portion of its wall with one set of openings and in another portion of its wall with a plurality of spaced and adjustably inclined sheet metal strips which extend horizontally and constitute another set of openings, and means for whirling the material to be defibrated around in the casing in a vertical plane in a direction opposite to that in which the strips are inclined, one of said sets of openings serving as outlets for the defibrated material, and the other set serving as outlets for the fiber removed from the material.

In testimony whereof we have hereunto subscribed our names.

CECIL L. BOTHWELL.
KIRTLAND C. BARTON.
ROSCOE BARTON.